(12) United States Patent
Weng (10) Patent No.: US 6,916,189 B2
(45) Date of Patent: Jul. 12, 2005

(54) INTERNAL CONNECTOR

(75) Inventor: Shih-Lung Weng, Kaohsiung (TW)

(73) Assignee: Benq Corporation, Taoyuan Shien (TW)

( * ) Notice: Subject to any disclaimer, the term of this patent is extended or adjusted under 35 U.S.C. 154(b) by 0 days.

(21) Appl. No.: 10/847,437

(22) Filed: May 18, 2004

(65) Prior Publication Data

US 2004/0235327 A1 Nov. 25, 2004

(30) Foreign Application Priority Data

May 20, 2003 (TW) ........................................ 92113579 A (51) Int. Cl.[7] .............................................. H01R 13/62
(52) U.S. Cl. ..................................... 439/159; 439/188
(58) Field of Search ................................ 439/152–160, 439/630, 923, 328, 924.1, 144

(56) References Cited

U.S. PATENT DOCUMENTS 6,206,710 B1   3/2001  Chen
6,398,567 B1 *  6/2002  Nishimura ................... 439/159
6,641,413 B2 * 11/2003  Kuroda ........................ 439/159
6,817,874 B2 * 11/2004  Okabe ......................... 439/157
6,821,136 B2 * 11/2004  Lai ............................. 439/159

FOREIGN PATENT DOCUMENTS

TW               433605            5/2001

* cited by examiner

*Primary Examiner*—J. F. Duverne
(74) *Attorney, Agent, or Firm*—Rabin & Berdo, P.C.

(57) ABSTRACT

An internal connector including a carrying portion, a connecting portion, an elastic component and a second positioning component is disclosed. The internal connector is installed in an electronic apparatus with an insert card device. The connecting portion having a first positioning component is equipped on the carrying portion. And the first positioning component includes an initial structure and a stopper. The connecting portion is used to be connected with the insert card device and to slide between a first position and a second position. The elastic component moves the connecting portion to the first position or the second position. The second positioning component is movably disposed at one terminal of the carrying portion.

20 Claims, 10 Drawing Sheets

INTERNAL CONNECTOR

This application claims the benefit of Taiwan application Serial No. 92113579, filed May 20, 2003. the subject matter of which is incorporated herein by reference.

BACKGROUND OF THE INVENTION

1. Field of the Invention

The invention relates in general to a connector, and more particularly to an internal connector, which connects an insert card device to an electronic apparatus.

2. Description of the Related Art

A universal serial bus (USB) connector is externally connected to a notebook computer. Conventionally, a USB insert card device used for connecting with the USB connector is exposed and projecting out from the notebook computer.

In comparison with a desktop computer, a portable feature is a main advantage of the notebook computer, which is also named laptop computer. However, it is a disadvantage that the USB insert card device and the notebook computer need to be carried separately according to the conventional design of the USB connector. Therefore, the conventional design greatly reduces portability of the notebook computer.

SUMMARY OF THE INVENTION

In view of the above-mentioned shortcomings, it is therefore an objective of the present invention to provide an internal connector. The internal connector of the present invention is able to receive an insert card device inside a notebook computer, so that the notebook computer can possess the fully portability, and also facilitate a user to carry the notebook computer with the insert card device very conveniently.

According to the above-mentioned objective of the present invention, an internal connector is provided, which is installed in an electronic apparatus, a notebook computer for example. The internal connector is used for connecting an insert card device and the electronic apparatus, where the insert card device can be located inside the electronic apparatus. The internal connector includes at least a connecting portion, a first elastic component, and a carrying portion. The connecting portion having a first positioning component such as an M-shape receptacle for electrically connected with the insert card device. The M-shape receptacle includes an inlet, a first peak, a stopper, a second peak, and an initial structure, which is formed by an outlet and a guiding block located in the outlet. The first elastic component is coupled with the connecting portion and the carrying portion, respectively. The carrying portion provides a recovery force of the first elastic component to the connecting portion when the first elastic component is deformed. The connecting portion is movably disposed on the carrying portion. The carrying portion includes a second positioning component and a second elastic component. The second elastic component axially moves the second positioning component toward the outlet along. When the insert card device pushes the connecting portion so that the first positioning component move toward the second positioning component, and the second positioning component touches the guiding block. When the first elastic component deforms, and the second positioning component is directed to the inlet by the guiding block, the second positioning component moves to the first peak. At this moment, the insert card device is inserted inside the connecting portion and electrically coupled to the connecting portion. Sequentially, the recovery force pulls back the connecting portion until the second positioning component moves to the stopper. At this moment, the second positioning component is coupled to the connecting portion, and the insert card device is disposed inside the electronic apparatus. Moreover, the insert card device pushes the connecting portion so that the second positioning component moves from the stopper to the second peak. When the recovery force pulls back the connecting portion so that the second positioning component moves from the second peak to the outlet and off the outlet. When the recovery force continues to pull back the connecting portion, a part of the insert card device can be exposed to the electronic apparatus, and also the insert card device can be easily taken out of the electronic apparatus. In addition, the first positioning component of the connecting portion such as the M-shape receptacle, and the second positioning component and the elastic component equipped on the carrying portion can be replaced with one another. The operation principle of each component and an interaction relationship between each component can be applied after replacement. Beside, an effect achieved after replacement will be still the same.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
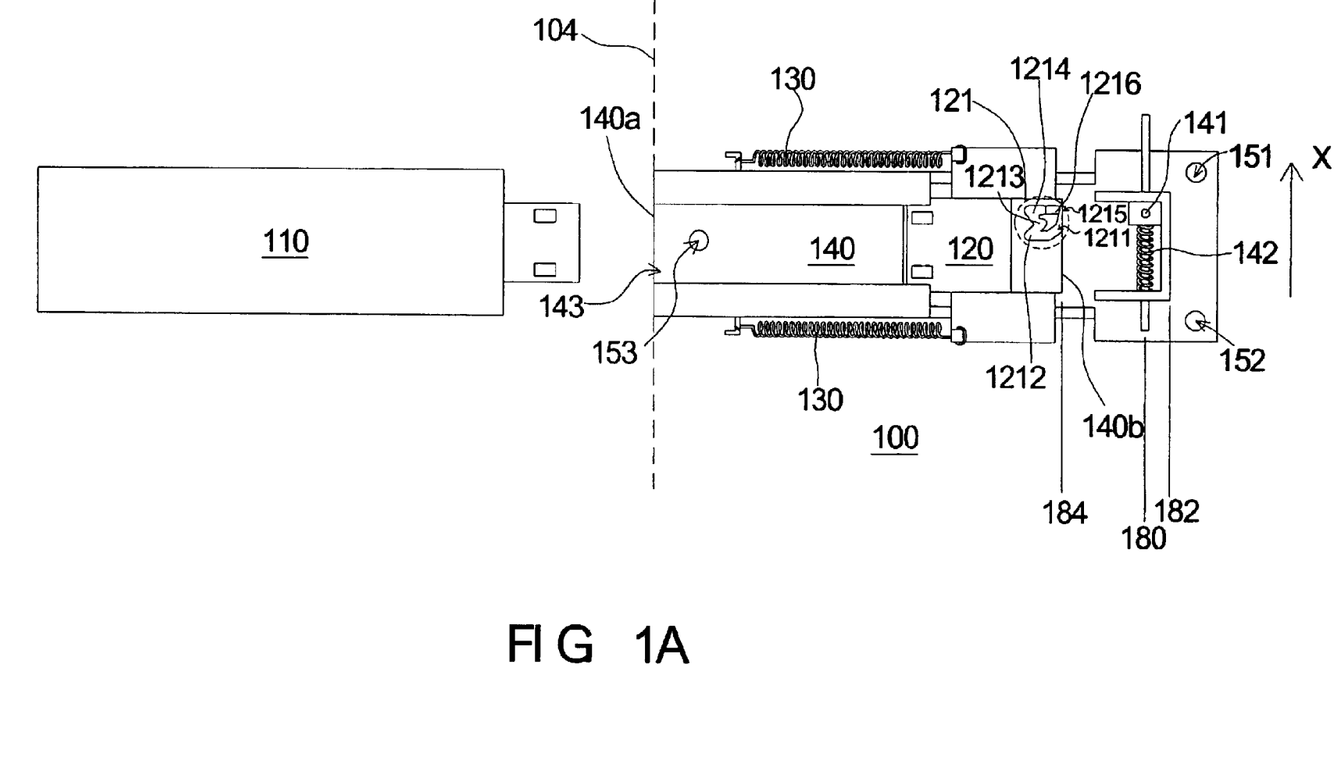
FIG. 1A is a structural diagram showing an internal connector of a preferred embodiment of the present invention.
Figure 1B:
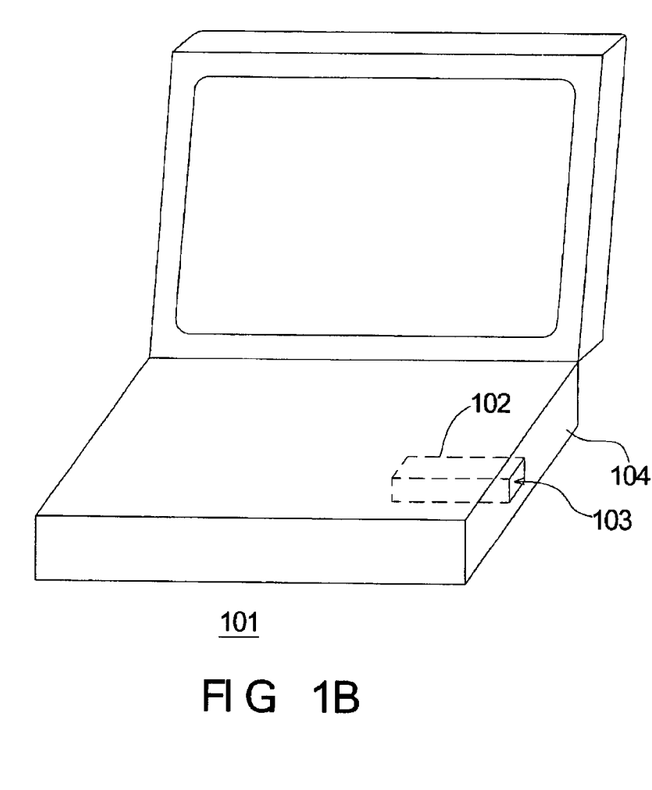
FIG. 1B is a diagram showing the internal connector located inside a notebook computer.

Referring to FIG. 1A and FIG. 1B simultaneously, FIG. 1A is a structural diagram showing an internal connector of a preferred embodiment of the present invention, while FIG. 1B is a diagram showing the internal connector located inside a notebook computer. An internal connector 100 is installed inside an installation space 102 of an electronic apparatus of a notebook computer 101, and also a terminal 140a of the internal connector 100 is about aligned at the same level with a side 104 of the notebook computer 101. The insert card device 110 can be inserted and installed in the internal connector 100 of the installation space 102 via a portal 103 (as shown in FIG. 1B), so that the insert card device 110 can be disposed inside the notebook computer 101 without projecting from the notebook computer 101. While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

The internal connector 100 mainly includes a connecting portion 120, an elastic component 130, and a carrying portion 140. In addition, an inserting channel 143 is disposed on the carrying portion 140 for directing the insert card device 110 to level at the connecting portion 120.

The connecting portion 120 having a first positioning component such as an M-shape receptacle 121 is used for electrically connected with the insert card device 110. The M-shape receptacle 121 includes an initial structure, which is formed by an outlet 1215 and a guiding block 1216 located in the outlet 1215, an inlet 1211, a first peak 1212, a stopper 1213, and a second peak 1214. The elastic component 130 is coupled with the connecting portion 120 and the carrying portion 140, respectively.

The carrying portion 140 provides a recovery force to the connecting portion 120 by the first elastic component 130 when the first elastic component 130 is deformed, so that the connecting portion 120 slides to return to a position 182 or a position 184, and the connecting portion 120 can be pulled back to an original position. Besides, a terminal 140b of the connecting portion 120 can be slidably disposed on the carrying portion 140 among the position 180, the position 182, and the position 184. Therefore, the connecting portion 120 can move relative to the carrying portion 140 due to the movement of the elastic component 130.

The carrying portion 140 is equipped with a second positioning component 141 and a second elastic component 142. The second elastic component 142 is used for moving the second positioning component 141 toward the outlet 1215 along an axial direction X.

Accordingly, the carrying portion 140 of the internal connector 100 according to the present invention can be secured locked to the notebook computer 101 through openings 151, 152, and 153. And also the terminal 140a of the secured locked carrying portion 140 is about aligned at the same level with a housing of the notebook computer 101, so as to make it convenient to insert the insert card device 110 to the internal connector 100 and to take the insert card device 110 out from the internal connector 100. Further, the connecting portion 120 and the insert card device 110 can move relative to the carrying portion 140.

Figure 2A:
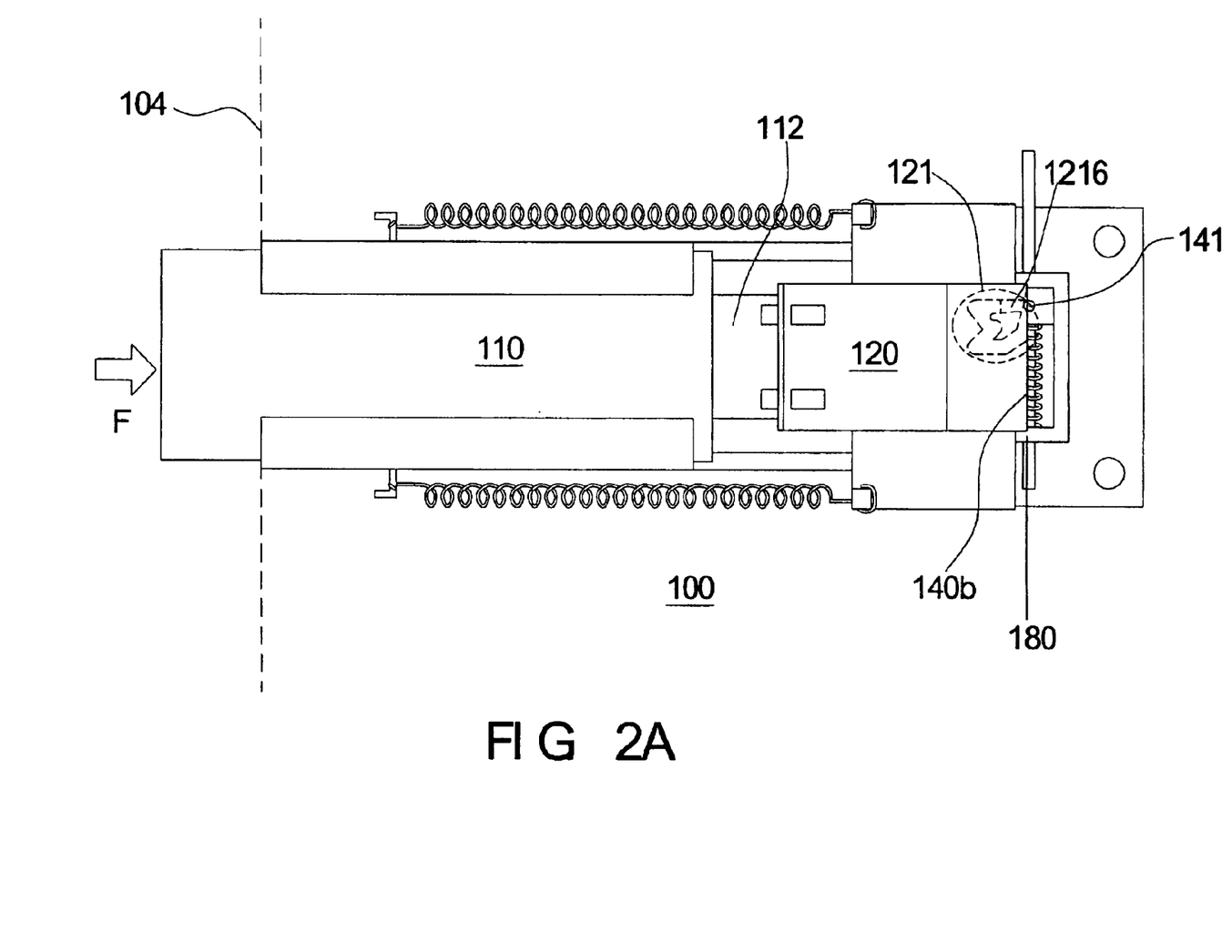
FIG. 2A illustrates the second positioning component touches the guiding block.

Referring to FIGS. 2A to 2E, they are structural diagrams showing operation principles of the internal connector according to the preferred embodiment of the present invention. FIG. 2A illustrates the second positioning component touches the guiding block. When the insert card device 110 is disposed inside the inserting channel 143 of the carrying portion 140 of the internal connector 100, an external force F is provided to the insert card device 110, so that a joint 112 of the insert card device 110 can touch and push the connecting portion 120. At this moment, half of the joint 112 of the insert card device 110 can hold the connecting portion 120, and also can drive the M-shape receptacle 121 to move forward. The M-shape receptacle 121 then moves toward the second positioning component 141, so that the second positioning component 141 can touch the guiding block 1216 in the outlet 1215 of the M-shape receptacle 121. At this moment, the terminal 140b of the connecting portion 120 is located in the position 180. The guiding block 1216 functions to have the second positioning component 141 affected by the second elastic component 142 be directed to the inlet 1211 of the M-shape receptacle 121, and also not to block the second positioning component 141 off from the outlet 1215.

Figure 2B:
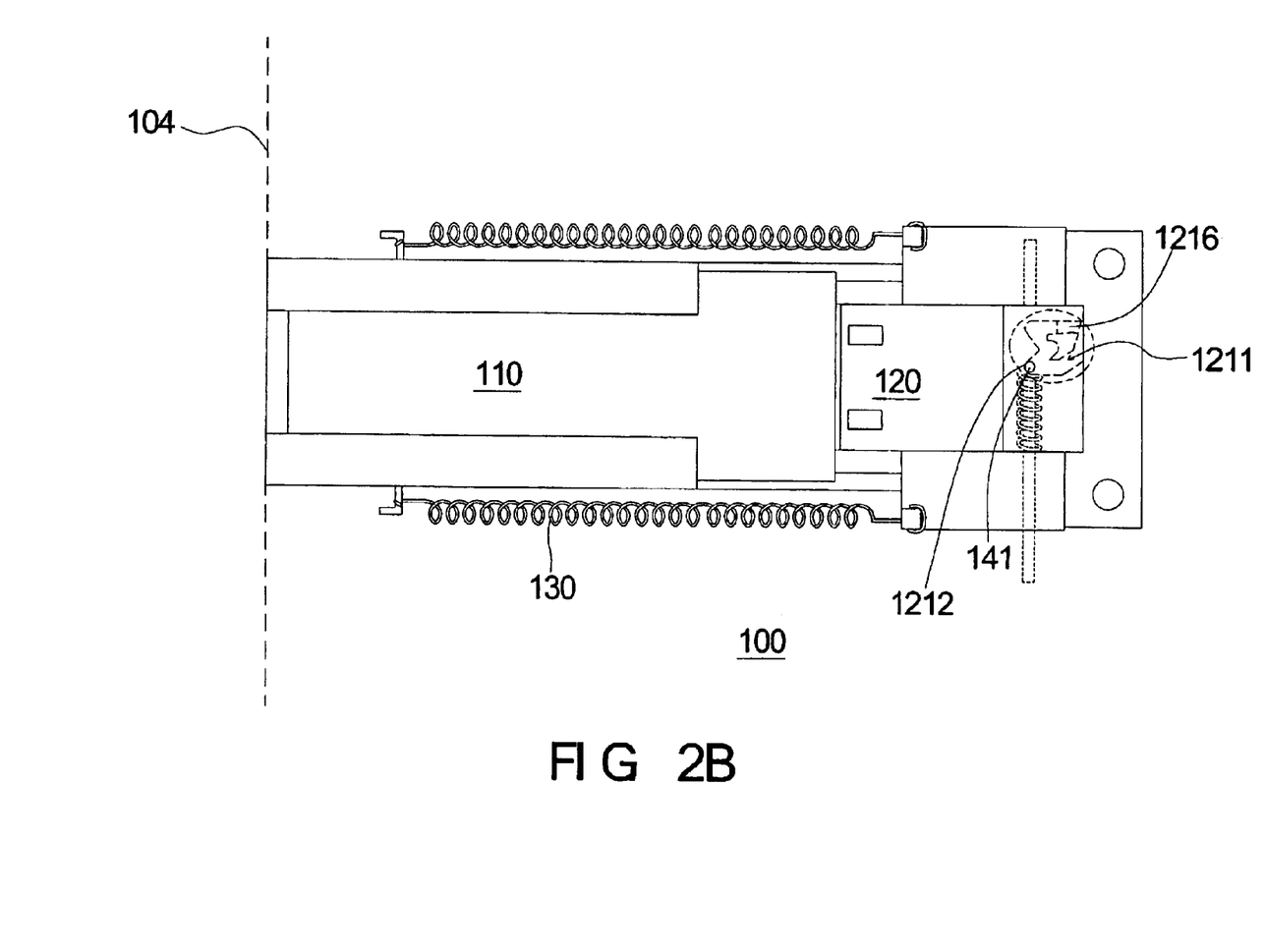
FIG. 2B illustrates a structural diagram showing the second positioning component moving to the first peak relative to the M-shape receptacle.

Referring to FIG. 2B, it illustrates a structural diagram showing the second positioning component moving to the first peak 1212 relative to the M-shape receptacle. Following the FIG. 2A, the external force F is continuously provided to deform the elastic component 130 in the FIG. 2B. And the second positioning component 141 is directed to the inlet 1211 by the guiding block 1216, so as to move the second positioning component 141 to the first high pint 1212. At this moment, the insert card device 110 is inserted and disposed inside the connecting portion 120 and also coupled to the connecting portion 120.

Figure 2C:
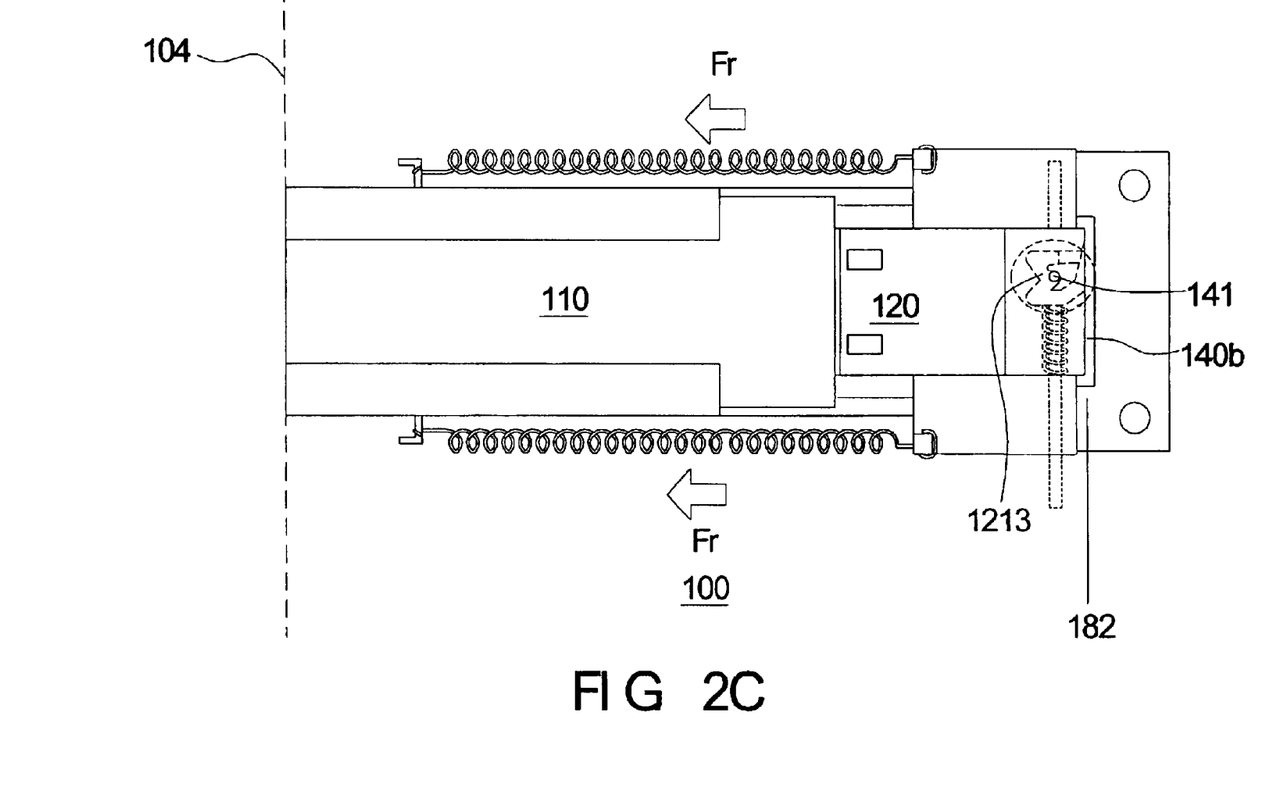
FIG. 2C illustrates a structural diagram showing the second positioning component moving to the stopper relative to the M-shape receptacle.

Referring to FIG. 2C, it illustrates a structural diagram showing the second positioning component moving to the stopper 1213 relative to the M-shape receptacle. Following the FIG. 2B, the external force F is then released to have the recovery force Fr pull back the connecting portion 120 in the FIG. 2C. By a mutual positioning of the M-shape receptacle 121 and the second positioning component 141, the second positioning component 141 moves to the stopper 1213 and fixed in the stopper 1213. At this moment, the second positioning component 141 is coupled to the connecting portion 120, the connecting portion 120 is located in the position 182, and the insert card device 110 is electrically connected to the notebook computer 101, so that the insert card device 110 and the internal connector 100 is disposed inside the notebook computer 101.

Figure 2D:
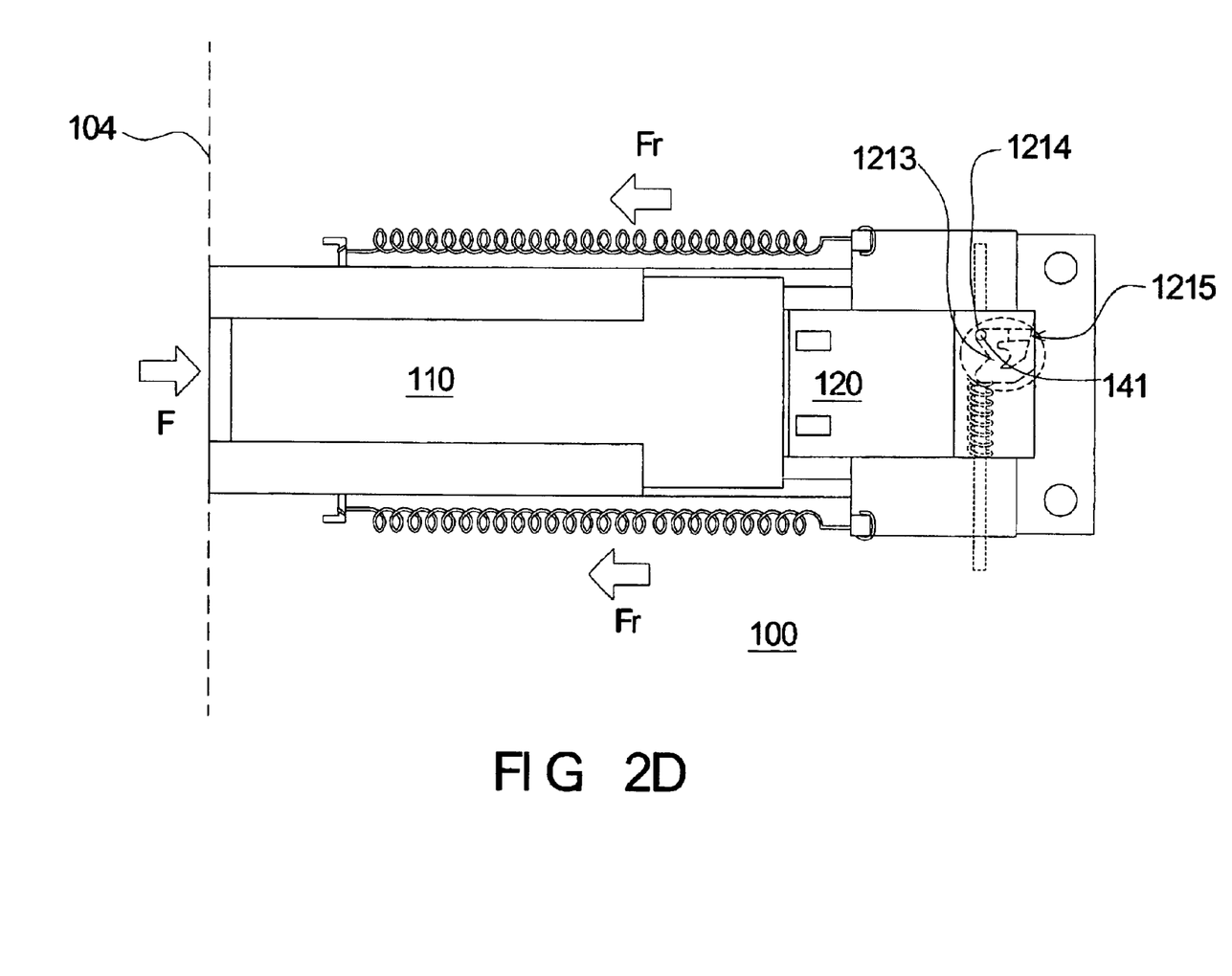
FIG. 2D illustrates a structural diagram showing the second positioning component moving to the second peak relative to the M-shape receptacle.
Figure 2E:
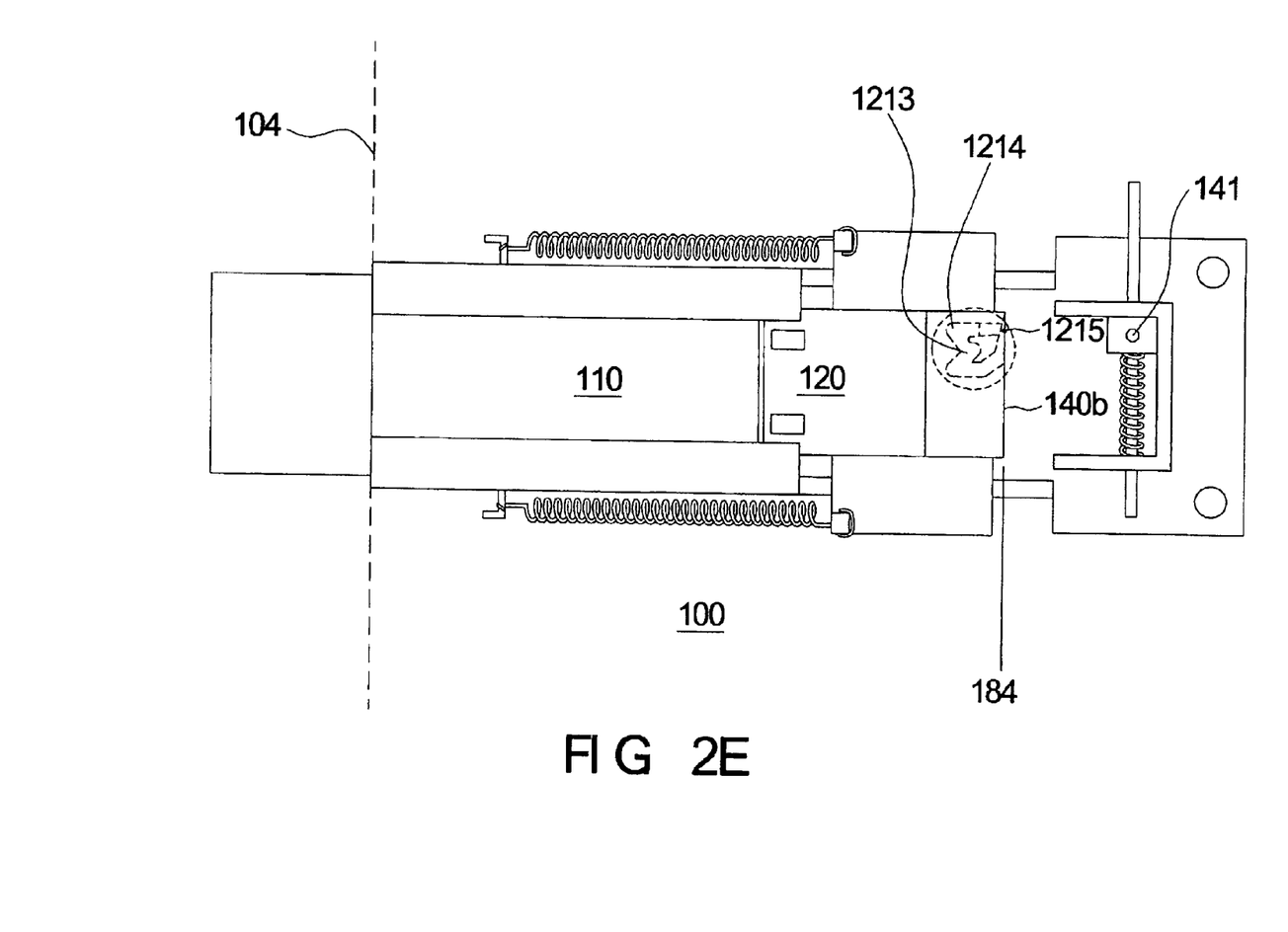
FIG. 2E illustrates the insert card device exposed to the internal connector.

Referring to FIG. 2D, it illustrates a structural diagram showing the second positioning component moving to the second peak 1214 relative to the M-shape receptacle. The external force F is provided to the insert card device 110 in the FIG. 2D, so that the second positioning component 141 can move from the stopper 1213 to the second high position 1214. Sequentially, the external force F is released to have the recovery force Fr pulls back the connecting portion 120. The second positioning component 141 moves along the M-shape receptacle 121 from the second peak 1214 to the initial structure, which is formed by the outlet 1215 and the guiding block 1216. The second positioning component 141 comes off the outlet 1215 and the stopper 1213 departs from the M-shape receptacle 121, so that the M-shape receptacle 121 is apart from the second positioning component 141. At this moment, the recovery force Fr continues to pull back the connecting portion 120, so that the terminal 140b of the connecting portion 120 recover to the position 184 as shown in FIG. 2E. Therefore, a part of the insert card device 110 can be exposed out of the notebook computer 101, so as to facilitate the insert card device 110 to be easily taken out.

Figure 3:
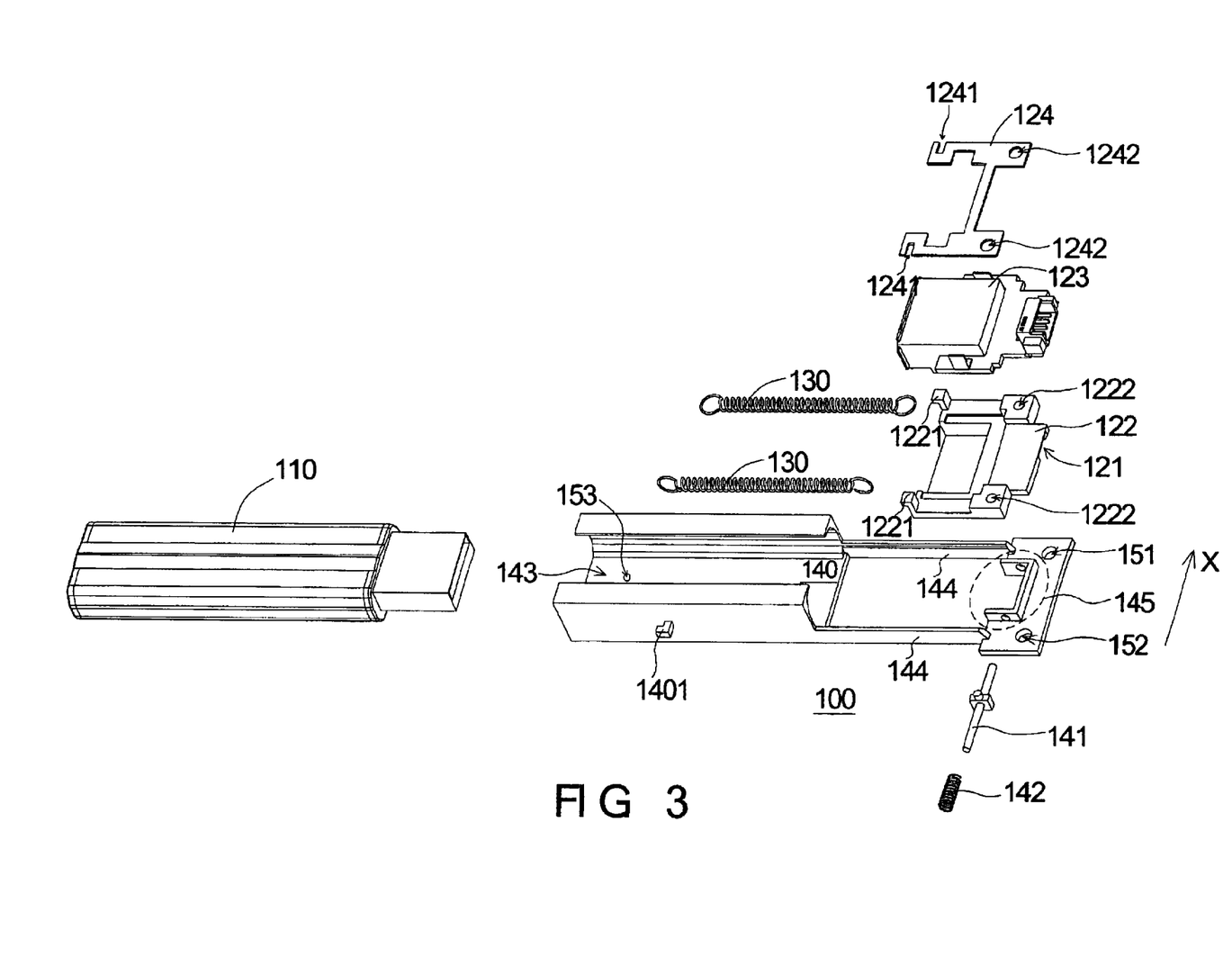
FIG. 3 illustrates a decomposition diagram showing the internal connector according to the preferred embodiment of the present invention.

Referring to FIG. 1A and FIG. 3 simultaneously, FIG. 3 illustrates a decomposition diagram showing the internal connector according to the preferred embodiment of the present invention. The internal connector 100 includes the connecting portion 120, the elastic component 130, and the carrying portion 140 as shown in the FIG. 1A. The connecting portion 120 further includes a connecting base 122, a connecting joint 123, and a fixing slice 124. The connecting portion 120 is coupled to the insert card device 110 by the connecting joint 123, and the M-shape receptacle 121 is located under the connecting base 122. For example, in the FIG. 3, the connecting joint 123 is coupled to the connecting base 122, and the elastic component 130 is coupled to the connecting base 122 by a raised portion 1221 of the connecting base 122. At last, the fixing slice 124 is used to couple to the above of the connecting joint 123. Screws can be used to lock the fixing slice 124 on the connecting base 122 through an opening 1242 and a screw hole 1222, so that the connecting base 122, the connecting joint 123, and the fixing slice 124 can be securely united. In addition, the raised portion 1221 can be engaged in a receptacle 1241, so that the elastic component 130 will not come off the raised portion 1221.

The carrying portion 140 can include the inserting channel 143, a guiding track 144, a holding part 145, the second positioning component 141, and the elastic component 142, for example. The inserting channel 143 is used to receive the insert card device 110, and the guiding track 144 is coupled to the inserting channel 143. The connecting base 122 is carried and loaded by the guiding track 144 by means of sliding. The connecting joint 123 is disposed opposite to the inserting channel 143. The second positioning component 141 is disposed in the holding part 145, so that the second positioning component 141 can move along the axial direction X in the holding part 145. The second positioning component 141 is disposed opposite to the M-shape receptacle 121. The elastic component 142 is coupled to the second positioning component by means of pre-deformed, and the elastic component 142 is used to provide the recovery force to the second positioning component 141, so that the second positioning component 141 moves toward the outlet 1215 of the M-shape receptacle 121 along the axial direction X in the holding part 145. And the elastic component 130 is coupled to the carrying portion 140 by the raised portion 1401 of the carrying portion 140.

Figure 4:
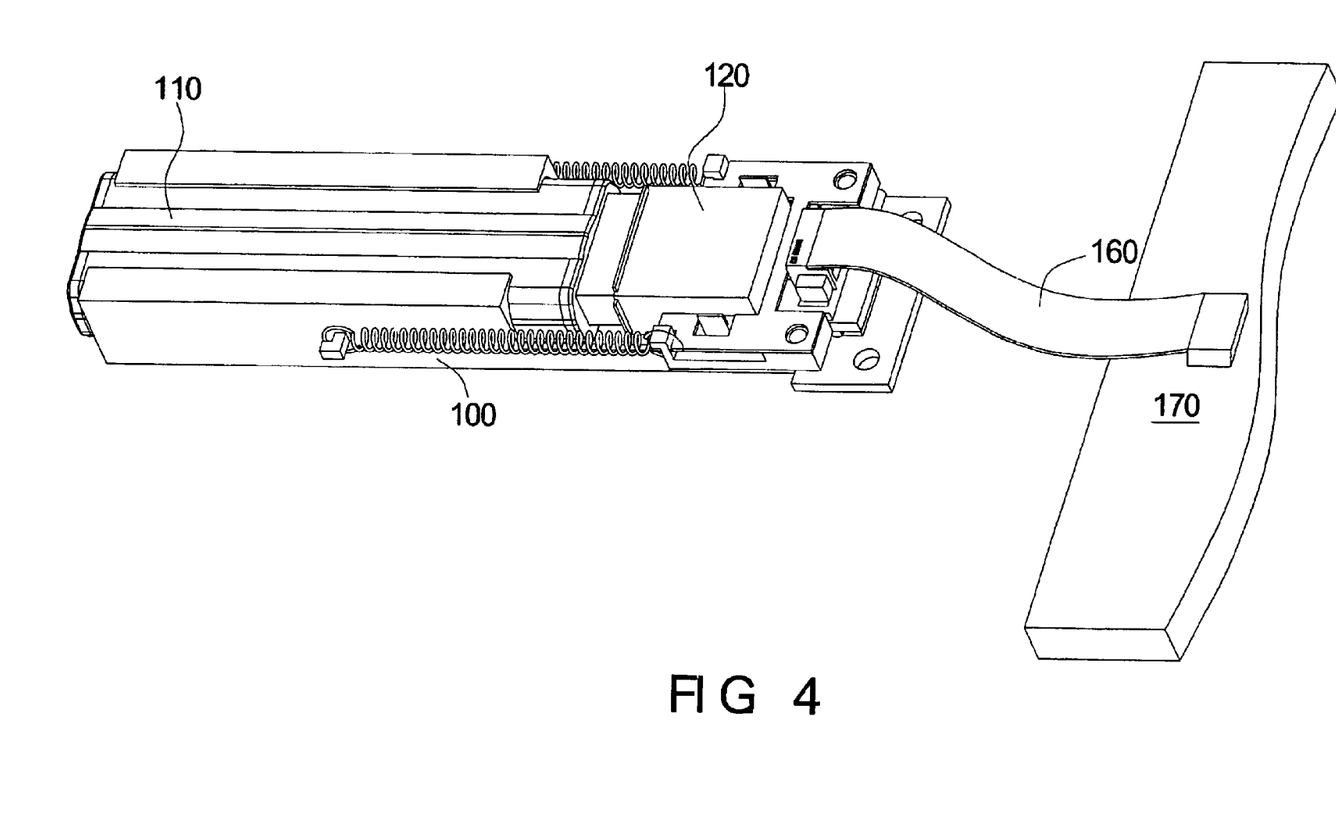
FIG. 4 illustrates a combination of each component to constitute the internal connector and the insert card device of the present invention.

The above-mentioned preferred embodiment, which combines each component to constitute the internal connector and the insert card device of the present invention, is illustrated in FIG. 4. The connecting portion 120 of the internal connector 100 of the present invention can include a flexible flat cable 160, so that the movable connecting portion 120 can be electrically connected with a circuit board 170 of the notebook computer by the flat cable 160. The connecting portion 120 according to the preferred embodiment of the present invention can be a universal serial bus (USB) connector, and the insert card device 110 can be a memory card device.

Figure 5:
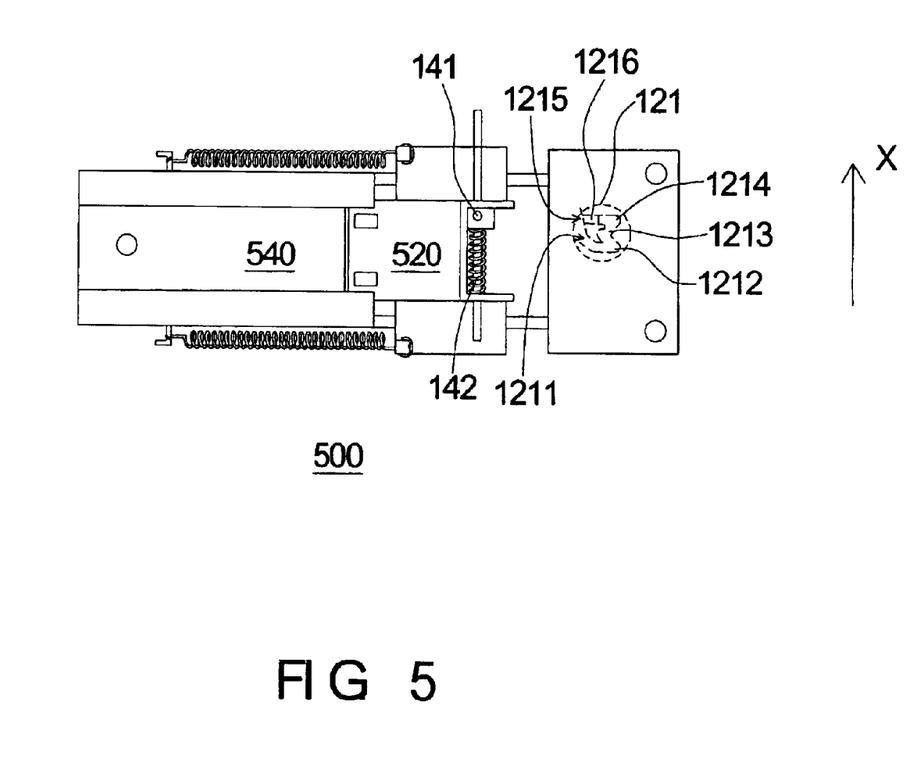
FIG. 5 illustrates the M-shape receptacle of the internal connector according to the preferred embodiment of the present invention, wherein the second positioning component and the elastic component equipped on the carrying portion can be replaced with one another.

In addition, the first positioning component of the connecting portion 120 such as the M-shape receptacle 121, and the second positioning component 141 and the elastic component 142 equipped on the carrying portion 140 can be replaced with one another. In other words, as shown in FIG. 5, the second positioning component 141 and the elastic component 142 can be disposed on the connecting portion 520, and also the first positioning component such as the M-shape receptacle 121 can be disposed on the carrying portion 540. And also after the internal connector 500 is replaced according to the above-mentioned method, in comparison with the internal connector 100 of the preferred embodiment of the present invention as disclosed above, an operation principle of each component and an interaction relationship between each component can be applied. Therefore, an effect achieved after replacement will be the same.

Therefore, the internal connector of the preferred embodiment of the present invention as disclosed above has advantages at least including: firstly, the design of the internal connector of the present invention is able to have a USB insert card device being disposed inside a notebook computer, without carrying the notebook computer and the USB insert card device separately, so that the notebook computer can possess the fully portability. And also a mechanic design of the internal connector of the present invention makes the USB insert card device easy to insert and take out, so as to facilitate a user easy to operate and use.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An internal connector, installed in an electronic apparatus, for connecting with an insert card device, wherein the internal connector comprises:
   a carrying portion having a first position and a second position;
   a connecting portion including a first positioning component, movably disposed on the carrying portion between the first position and the second position, for electrically connecting with the insert card device;
   an elastic component, for moving the connecting portion to the first position or the second position; and
   a second positioning component, which is disposed at one terminal of the carrying portion;
   wherein when the insert card device pushes the connecting portion to the first position, the first positioning component is combined with the second positioning component so that the insert card device is electrically connected with the electronic apparatus, and wherein when the insert card device pushes the connecting portion beyond the first position, the first positioning component departs from the second positioning component and then the connecting portion returns to the second position.

2. The internal connector according to claim 1, wherein the connector is a universal serial bus (USB) connector.

3. The internal connector according to claim 1, wherein the insert card device is a memory card device.

4. The internal connector according to claim 1, wherein the carrying portion has an inserting channel for directing the insert card device to level at the connecting portion.

5. The internal connector according to claim 1, wherein the electronic apparatus comprises a circuit board, and the connecting portion further comprises a flat cable, and wherein the connecting portion is electronically connected to the circuit board by the flat cable.

6. An internal connector, installed in an electronic apparatus, for connecting with an insert card device, the internal connector comprises:
   a connecting portion having a M-shape receptacle, for being electrically connected with the insert card device, wherein the M-shape receptacle includes an inlet, a first peak, a stopper, a second peak, and an outlet, and wherein the outlet includes a guiding block;

a first elastic component, which is coupled to the connecting portion; and a carrying portion coupled to the first elastic component, wherein the carrying portion provides a recovery force of the first elastic component to the connecting portion when the first elastic component is deformed, wherein the connecting portion is movably disposed on the carrying portion, wherein the carrying portion includes a positioning component and a second elastic component, and wherein the second elastic component moves the positioning component toward the outlet axially;

wherein the insert card device pushes the connecting portion so that the positioning component touches the guiding block, wherein when the first elastic component deforms and the positioning component is directed to the inlet by the guiding block, the positioning component moves to the first peak and the insert card device is inserted inside the connecting portion for being electrically coupled to the connecting portion, and wherein when the recovery force pulls back the connecting portion until the positioning component moves to the stopper, the positioning component is coupled to the connecting portion and the insert card device is disposed inside the electronic apparatus;

wherein the insert card device pushes the connecting portion so that the positioning component moves from the stopper to the second peak, wherein when the recovery force pulls back the connecting portion so that the positioning component moves from the second peak to the outlet and off the outlet, and wherein when the recovery force continues to pull back the connecting portion, a part of the insert card device is disposed outside the electronic apparatus.

7. The internal connector according to claim 6, wherein the connector is a universal serial bus (USB) connector.

8. The internal connector according to claim 6, wherein the insert card device is a memory card device.

9. The internal connector according to claim 6, wherein the carrying portion has an inserting channel for directing the insert card device to level at the connecting portion.

10. The internal connector according to claim 6, wherein the electronic apparatus comprises a circuit board, and the connecting portion further comprises a flat cable, and wherein the connecting portion is electronically connected to the circuit board by the flat cable.

11. An internal connector, installed in an electronic apparatus, for connecting with an insert card device, wherein the internal connector comprises:

a carrying portion, one terminal of which including a first positioning component;

a connecting portion movably disposed on the carrying portion between a first position and a second position, for electrically connecting with the insert card device;

an elastic component, for moving the connecting portion to the first position or the second position; and a second positioning component disposed on the carrying portion;

wherein when the insert card device pushes the connecting portion to the first position, the first positioning component is combined with the second positioning component so that the insert card device is electrically connected with the electronic apparatus, and wherein when the insert card device pushes the connecting portion beyond the first position, the second positioning component departs from the first positioning component and then the connecting portion returns to the second position.

12. The internal connector according to claim 11, wherein the connector is a universal serial bus (USB) connector.

13. The internal connector according to claim 11, wherein the insert card device is a memory card device.

14. The internal connector according to claim 11, wherein the carrying portion has an inserting channel for directing the insert card device to level at the connecting portion.

15. The internal connector according to claim 11, wherein the electronic apparatus comprises a circuit board, and the connecting portion further comprises a flat cable, and wherein the connecting portion is electronically connected to the circuit board by the flat cable.

16. An internal connector, installed in an electronic apparatus, for connecting with an insert card device, the internal connector comprises:

a carrying portion having an M-shape receptacle, wherein the M-shape receptacle comprises an inlet, a first peak, a stopper, a second peak, and an outlet, and wherein the outlet includes a guiding block;

a first elastic component, which is coupled to the carrying portion; and a connecting portion coupled to the first elastic component, being movably disposed on the carrying portion and electrically connected to the insert card device, wherein the connecting portion includes a positioning component and a second elastic component, and wherein the second elastic component moves the positioning component toward the outlet axially, and wherein the carrying portion provides a recovery force of the first elastic component to the connecting portion when the first elastic component is deformed;

wherein the insert card device pushes the connecting portion so that the positioning component touches the guiding block, wherein when the first elastic component deforms, and the positioning component is directed to the inlet by the guiding block, the positioning component moves to the first peak, and the insert card device is inserted inside the connecting portion for being electrically coupled to the connecting portion, and wherein when the recovery force pulls back the connecting portion until the positioning component moves to the stopper, the positioning component is coupled to the carrying portion and the insert card device is disposed inside the electronic apparatus;

wherein the insert card device pushes the connecting portion so that the positioning component moves from the stopper to the second peak, wherein when the recovery force pulls back the connecting portion so that the positioning component moves from the second peak to the outlet and off the outlet, and wherein when the recovery force continues to pull back the connecting portion, a part of the insert card device is disposed outside the electronic apparatus.

17. The internal connector according to claim 16, wherein the connector is a universal serial bus (USB) connector.

18. The internal connector according to claim 16, wherein the insert card device is a memory card device.

19. The internal connector according to claim 16, wherein the carrying portion has an inserting channel for directing the insert card device to level at the connecting portion.

20. The internal connector according to claim 16, wherein the electronic apparatus further comprises a circuit board, and wherein the connecting portion further comprises a flat cable, and wherein the connecting portion is electronically connected to the circuit board by the flat cable.

* * * * *